July 7, 1959
E. L. WHITE
2,893,151
MONUMENT ORNAMENT
Filed July 24, 1956
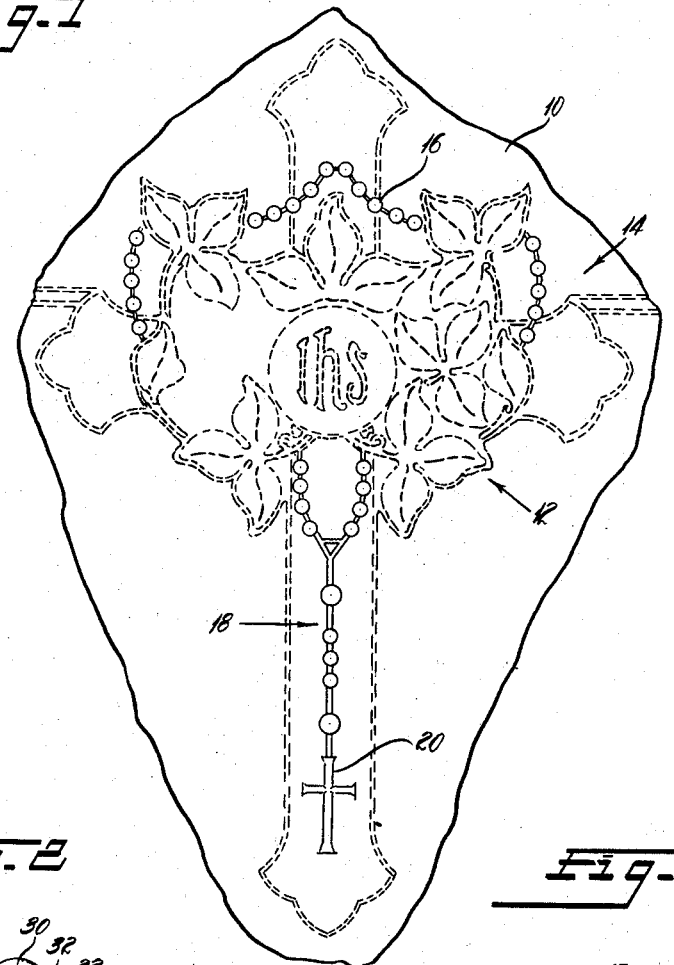
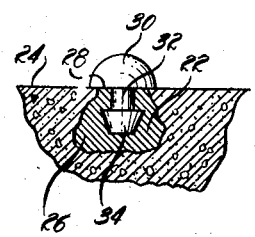
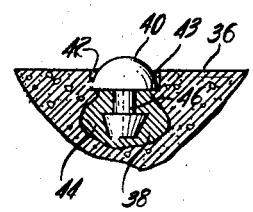
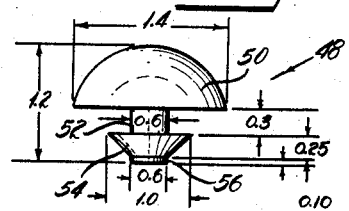
INVENTOR
*Ezra L. White*
BY
ATTORNEYS 2,893,151
MONUMENT ORNAMENT Ezra L. White, Barre, Vt., assignor to Rock of Ages Corporation, Burlington, Vt., a corporation of Vermont Application July 24, 1956, Serial No. 599,752

2 Claims. (Cl. 41—34)

This invention relates to the art of ornamentation and more particularly to an improved ornamentation and method of ornamenting a granite or other stone memorial monument or grave marker.

The use of a rosary design upon memorial monuments or grave markers has long been popular, and one method of applying such a design is shown in U.S. Patent 2,349,065, issued May 16, 1944. According to the method there disclosed an entire rosary design is cut or sand blown into the surface of the stone so as to provide a series of hemispherical pockets connected by shallower narrow elongated channels or grooves. These pockets and channels are then filled with a cement and spherical and cylindrical members are pressed thereinto. The beads previously used have either been one piece spherical beads or hemispherical beads having metallic eyes or screws depending therefrom as attaching elements.

While this type of construction presents an originally pleasing appearance it does not wear well upon exposure to the elements and the cylinders and beads tend to become loose and dislodged from the monument or marker. This lack of satisfactory wear characteristics is due to several different factors. Where spherical one piece beads are pressed into cement, it will be apparent that three different materials, i.e., the bead, the cement and the granite, each having different coefficients of thermal expansion, are being united into intimate contact in a composite body. Where the beads consists of a hemispherical element having a metal eye or screw attached thereto, four different coefficients of expansion are involved and the problem is even further aggravated. Because of the different coefficients of expansion of these various materials the cement tends to leave a slight clearance around the beads and in the case of the spherical and cylindrical beads this ultimately results in the bead falling out of the supporting cement structure. In the case of the hemispherical beads having metallic inserts, the metallic inserts have such a markedly different coefficient of expansion from the cement that continuous expansion and contraction cracks the cement and eventually wears a sufficient hole to enable these beads to also fall from the structure. Another factor contributing to eventual defacement of the design is the tendency of the grooves between the hemispherical pockets to allow water to seep below the cement in the pockets and to force the cement out when the water freezes. This causes the cylinders to drop from the face of the marker and further accelerates the deterioration of the cement holding the beads in position.

It is a primary object of the present invention to provide a stone monument with a rosary design which is not only pleasing and realistic in appearance but which is also durable and long lasting.

It is another object of the invention to provide a stone monument with a rosary design which is resistant to the elements.

These and further objects and advantages of the invention will become more apparent upon reference to the following specification and claims and the appended drawings wherein:

Figure 1 is a fragmentary elevational view of a monument provided with a rosary design in accordance with the present invention;

Figure 2 is an enlarged fragmentary section of the mounting of a bead on a marker according to one embodiment of the invention;

Figure 3 is an enlarged fragmentary section of the mounting of a bead on a marker according to another embodiment of the invention; and Figure 4 is an elevation of a preferred embodiment of bead.

In Figure 1 there is shown a stone monument 10 having a large leaf or flower and cross design 12 cut or otherwise suitably provided thereon, and further having a small rosary design provided thereon with the rosary design having the appearance of being draped over the cross or flower and cross design.

As is well known, a rosary consists of a loop 14 composed of tubular beads 16 connected together by means of a chain or cord and a pendent 18 depending from the loop and including a string of beads terminating with a cross 20.

In accordance with the present invention, the rosary design is formed by cutting pockets into the surface of the stone at the positions where it is desired to locate the beads. These pockets are preferably not hemispherical in shape but are undercut to provide positive anchoring for the cement. The pockets may be formed in any suitable manner, such as by sand blasting, drilling, grinding, ultrasonic erosion or cutting.

Referring to Figure 2 there is shown a pocket 22 in a stone 24 wherein the cross section of the pocket at its bottom 26 is larger than the cross section of the pocket at its top 28. This undercutting locks the entire cement body in position and is particularly strong since the locking action does not depend upon narrow and relatively weak protrusions from the main cement body. In the embodiment of the invention shown in Figure 2, the undersurface of the bead 30 sealingly engages the top of the pocket to seal the pocket against the entrance of moisture.

The bead 30 is anchored into position in the cement by means of a shank 32 depending therefrom and by means of a truncated cone anchoring section 34 which positively locks the bead into position in the cement. It will be apparent that shapes other than a truncated cone could be used, such as a pyramid or any tapered configuration. The entire bead, shank and truncated cone portions are unitary, monolithic and homogeneous and are formed from a material having a coefficient of expansion substantially the same as the coefficient of expansion of the stone. Several types of glass satisfy this requirement.

Referring to Figure 2 it will be seen that contraction of the stone tends to decrease the size of the mouth of the pocket 22 to firmly lock the cement and bead therein. Where the coefficient of expansion of the bead is substantially the same as that of the stone the bead contracts a proportionate amount and the tendency for water to seep into the connection is minimized. The cement is also selected to have a coefficient of expansion substantially the same as that of the stone. The locking action obtained with an undercut pocket is to be contrasted to the effect of a similar contraction of a stone having a hemispherical pocket where the contraction of the pocket exerts force to expel the cement and bead rather than to hold it in position. Further, since according to my invention the cement body does not have slender protuberances therefrom there is little likelihood that anchoring portions of the body will break off upon expansion and contraction.

While the embodiment of the invention shown in Figure 2 utilizes a ratio of bead diameter to diameter of the mouth of the pocket which provides for the bead to completely cover the mouth of the pocket, it is also contemplated that the bead may be smaller than the mouth of the pocket as is shown in the bead mounting of Figure 3. In Figure 3, the stone 36 is first drilled with a diamond drill or other suitable apparatus to provide a countersunk hole 42 which is slightly larger than the bead 40 and which has an inwardly projecting shoulder 43. Below the shoulder 43, the hole is provided with an undercut pocket 44. The bead 40 fits snugly in the hole 42 and rests on the shoulder 43 and the truncated cone anchor 46 in embedded in a mass of cement 38. This mounting prevents water from getting in back of the bead and, if desired, a thin layer of cement may be placed around the edge of the bead 40 for further protection. It will be apparent of course that when a countersunk arrangement of the type shown in Figure 3 is used the shank of the bead must be long enough to insure that the truncated portion is within the undercut pocket. Where portions of the cement are visible to the eye, as in the mounting of Figure 3, the cement is selected so as to have a color substantially the same as the color of the stone in which the mounting is made. This can be achieved quite simply by mixing pigment with the particular cement selected.

Referring to Figure 4 there is shown a preferred embodiment of a bead 48. This bead consists of a generally hemispherical bead 50 having a shank 52 and truncated cone anchoring portion 54. Beneath the anchoring portion 54 the shank is continued at 56. Preferred relative dimensions of this type bead are shown in the drawing. The truncated cone anchoring portion 54 not only performs a locking function but also is generally pointed in configuration to facilitate insertion of the bead into the soft cement.

It will be apparent from the foregoing that there has been provided a rosary design for stone memorial monuments or grave markers which is pleasing and realistic in appearance and extremely durable and long lasting. While the invention has been described in connection with a rosary design it will be understood by those skilled in the art that other ornaments or medallions may be similarly attached to monuments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stone monument having a rosary design cut in the surface thereof so as to provide a plurality of undercut pockets in the surface of said stone, a cement filling for said pockets, each of said cement fillings having downwardly and outwardly extending portions from the mouth of said pockets, a bead having a coefficient of thermal expansion substantially equal to that of said stone embedded in each cement filling, said beads comprising a rounded generally hemispherical head, a cylindrical shank depending therefrom, an anchoring member attached to said shank and of greater width than said shank, said anchoring member having a tapered shape having its larger end adjacent but longitudinally spaced from the underside of said head, the mouth of said pockets provided with an annular inwardly projecting lip to form a seat for the underside of said hemispherical head of said bead and to engage the downwardly and outwardly extending portions of said cement to lock said cement in position, and a countersunk portion exterior of said annular inwardly projecting lip adapted to receive at least a portion of said hemispherical head of said bead.

2. A stone monument as described in claim 1 wherein on a relative basis the diameters of the base of said hemispherical head, the cylindrical shank, and the base of said anchoring member adjacent but longitudinally spaced from said head are respectively about 1.4, 0.6 and 1.0.

References Cited in the file of this patent

UNITED STATES PATENTS

| | | |
|---|---|---|
| 2,077,749 | Fischer | Apr. 20, 1937 |
| 2,290,088 | Bleakley | July 14, 1942 |
| 2,349,065 | White | May 16, 1944 |